United States Patent

[11] 3,622,469

[72] Inventors Gene S. Alberts
Essex Junction, Vt.;
James M. Brownlow, Crompound, N.Y.
[21] Appl. No. 743,736
[22] Filed July 10, 1968
[45] Patented Nov. 23, 1971
[73] Assignee International Business Machines Corporation
Armonk, N.Y.

[54] METHOD FOR EDGE-PLATING COUPLED FILM DEVICES
7 Claims, 3 Drawing Figs.

[52] U.S. Cl. .......... 204/15, 204/43, 204/44
[51] Int. Cl. .......... C23b 5/48, C23b 5/32, C23b 5/34
[50] Field of Search .......... 204/15, 44, 43; 340/174 TF

[56] References Cited
UNITED STATES PATENTS

| | | | |
|---|---|---|---|
| 3,461,438 | 8/1969 | Chang et al. | 340/174 |
| 3,375,503 | 3/1968 | Bertelsen | 340/174 |
| 3,480,522 | 11/1969 | Brownlow | 204/40 |

*Primary Examiner*—John H. Mack
*Assistant Examiner*—T. Tufariello
*Attorneys*—Hanifin and Jancin and Hansel L. McGee

ABSTRACT: An improved method of edge-plating large coupled film memories is disclosed. The improvement resides in the edge-plating step in which an etched coupled film device is immersed in a nickel-iron or nickel-iron-copper plating bath comprising $K_2CO_3$ 0.0 moles to 0.00362 moles; NaK tartrate 0.0248 moles to 0.0532 moles; $NiCl_2 \cdot 6H_2O$ 0.084 moles to 0.211 moles; $FeSO_4 \cdot 7H_2O$ 0.0054 moles to 0.0211 moles; $CuSO_4 \cdot 5H_{b8}{}^{o}$ 0.0006 moles to 0.002 moles; saccharin as a 10 percent solution 0.10 g. to 0.06 g.; $H_2O$ to make 1 liter; and having a pH of from 3.9 to 5.8. The magnetic edge film is plated by a pulse plating technique in which the current pulses have a duration of about 6 seconds, the solution is stirred for about 4 seconds and the pulse remains off for about 24 seconds before starting the next current pulse.

INVENTORS
GENE S. ALBERTS
JAMES M. BROWNLOW

BY Hansel L. McGee
ATTORNEY

METHOD FOR EDGE-PLATING COUPLED FILM DEVICES

BACKGROUND OF THE INVENTION

Coupled film memories are memories in which conductors (e.g., each bit sense line of the array) are sandwiched between an associated tier of magnetic films that are respectively adapted to be magnetized in a mutually complimentary or antiparallel fashion when the respective conductor is energized. These devices are increasingly gaining in importance in computer memory application. The films are coupled by flux closure, i.e., a close flux path encircling the conductor between the magnetic films provided either through air or by means of infringing magnetostatic fields or preferably through common magnetic materials. In devices in which the thickness of the conductor equals or exceeds 2 percent of the conductor width, for example, a conductor which is 3 microns thick and 100 microns wide (3 percent), it is necessary that the magnetic films be coupled through common magnetic material, since a demagnetizing effect occurs with air coupling due to the thick conductor. This demagnetizing effect detracts from the storage capabilities of the device.

In magnetically coupled devices, it is desirous that the edge material used for flux closure have coercivities of about 6 or less and should have high permeabilities. Various attempts heretofore made to edge-plate these magnetic memory elements have been troubled with many problems. One such problem is that the high potentials present at the corners of the etched bit lines cause the deposited metal to grow at the corners in the form of tress. The subsequently deposited metal will grow more on the trees rather than at the edges. As a result, the plated-edge films are nonuniform and are found to have coercivities of 10 or more and to have low permeabilities. U.S. Pat. No. 3,031,386, discloses a bath and a method which is used for plating cylindrical forms. One would suppose that such bath and method could be used for the present purposes. However, when using the baths and method disclosed therein for the purpose of edge-plating the above problems remain apparent. Although other present day electrodeposition techniques possess many highly desirable potentialities, today there is yet to be economically produced thereby any commercially acceptable coupled film elements which possess the above mentioned characteristics.

BRIEF DESCRIPTION OF THE INVENTION

According to the present invention, there is provided an electrolytic plating bath and a method for edge-plating magnetic films. The bath is comprised of copper ions in the range of about 0.0006 to 0.002 moles/liter; iron ions in the range of about 0.0054 to 0.0211 moles/liter; nickel ions in the range of about 0.084 to 0.211 moles/liter; chloride ions in the range of about 0.168 to 0.422 moles/liter; sulfate ions in the range of about 0.006 to 0.0217 moles/liter; tartrate ions in the range of about 0.0248 to 0.0532 moles/liter; $K_2CO_3$ in the range of about 0.00 to 0.00362 moles/liter; saccharin as a 10 percent solution in the range of about 0.10 to 0.30 g./liter; and Triton X-100 (a surfactant prepared by Rohmand Haas Co.) as a 1 percent solution in the range of about 0.3 to 0.6 g./liter. The pH of the bath is maintained at about 3.9 to 5.8. The magnetic material is deposited by a current pulse having a duration of about 6 seconds, halting the pulse and stirring for 4 seconds with the current remaining off for a 24-second period and repeating the pulse cycle until the desired film thickness is obtained. Edge-plated films deposited from the above baths and operating conditions provide relatively strain free and uniform films. The films have coercivities of 6 or less and have relatively high magnetic permeability.

Consequently, the primary object of the present invention is to devise an improved aqueous electrolytic bath and a method for edge-plating ferromagnetic materials on sharp edges and cylindrical forms whereby new and improved magnetic coupled film devices are economically produced by mass production techniques and which elements possess the above-mentioned characteristics.

The foregoing and other objects, features, and advantages of the invention would be more apparent from the following more particular description of the preferred embodiments of the invention, as illustrated in the accompanying drawings and samples.

DESCRIPTION OF THE PREFERRED EMBODIMENTS

Figure 1:
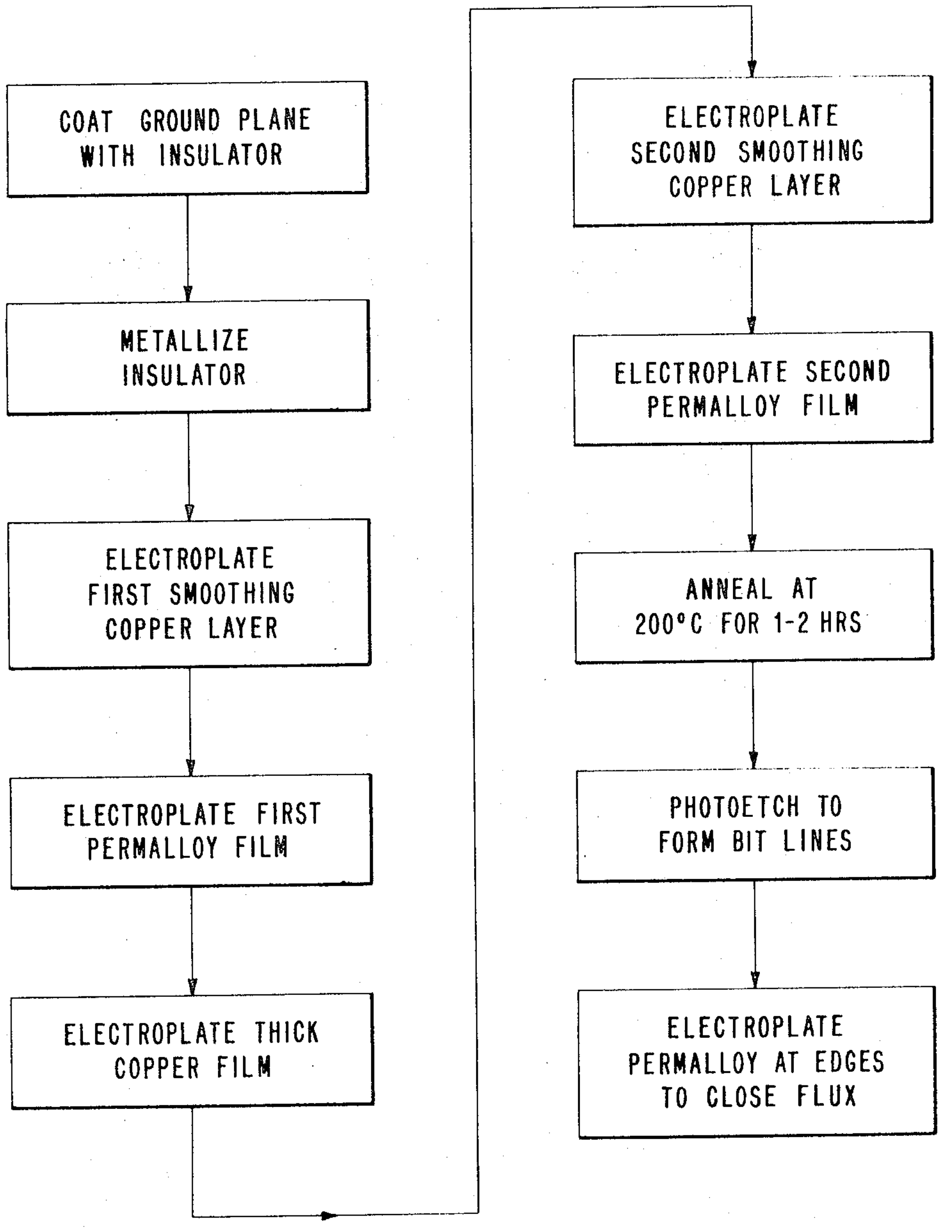
FIG. 1 is a flow chart indicating the fabrication steps in the preparation of magnetic coupled film devices.
Figure 2:
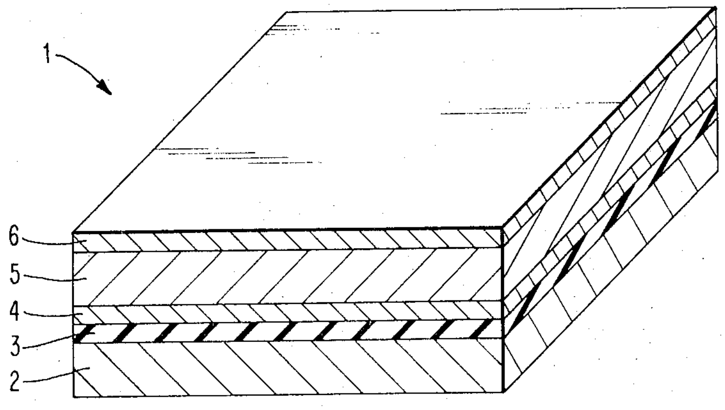
FIG. 2 is a multilayered device prepared by the method indicated in FIG. 1 just prior to the photoetching step disclosed therein.

In the practice of the invention, a multilayered device, generally designated 1, as shown in FIG. 2 is prepared according to the flow chart of FIG. 1. A ground plane 2 having disposed thereon an insulating layer 3 serves as a substrate. A thin conductive metal layer is evaporated onto the insulator to serve as a cathode in a subsequent electrodeposition of a smoothing copper film. The smoothing copper film is deposited by immersing the substrate on a dilute electrolytic bath comprising a water-soluble copper salt, a source of sulfate ions, a source of nitrate ions, tartaric acid, gelatin and a surfactant. A current having a density of about 30 to 40 ma./cm.$^2$ is passed between anodes and the cathodic substrate until a smoothing copper film of desired thickness is obtained. A more detailed teaching of the specific baths and method of depositing smoothing copper films is disclosed in the commonly assigned copending application, filed as IBM docket YO967-142 on June 17, 1968, and entitled "An Improved Electrolytic Plating Bath for Depositing a Smoothing Copper Film."

After rinsing the copper-plated substrate, the substrate is immersed in an electroplating bath containing Ni and Fe ions or Ni, Fe and Cu ions. A current is passed between the anode and the cathodic substrate. A series of timed pulses, e.g., the pulses are maintained at a duration of about 10 seconds after which the current is turned off and vigorous agitation of the bath is applied for 4 to 6 seconds, the cell is allowed to rest at zero current for 30–50 more seconds, after which the cycle is repeated until a sufficiently thick magnetic film 4, e.g., 2,500 to 4,000 A. thick, is deposited. The details of electrodepositing the magnetic films are found in the commonly assigned copending Pat. applications, Ser. No. 573,417 to J. M. Brownlow, filed Aug. 16, 1966, and now U.S. Pat. No. 3,480,522, and Ser. No. 601,951 to J. M. Brownlow and Harald Dahms, filed Dec. 15, 1966.

A thick conducting copper film 5 is next deposited by immersing the magnetic film-cladded substrate as the cathode, in an electrolytic bath containing a water-soluble copper salt, a source of sulfate ions, a source of nitrate ions, formic acid and acetic acid. A current is passed between the anode and cathode until a sufficiently thick copper film is deposited. A preferred method for depositing thick conductive films and baths therefore can be found in the commonly assigned copending patent application filed as IBM docket YO967-141 to J. M. Brownlow, entitled "An Improved Copper Plating Bath and a Method for Depositing Thick Copper Films Therefrom" filed on June 17, 1968.

Figure 3:
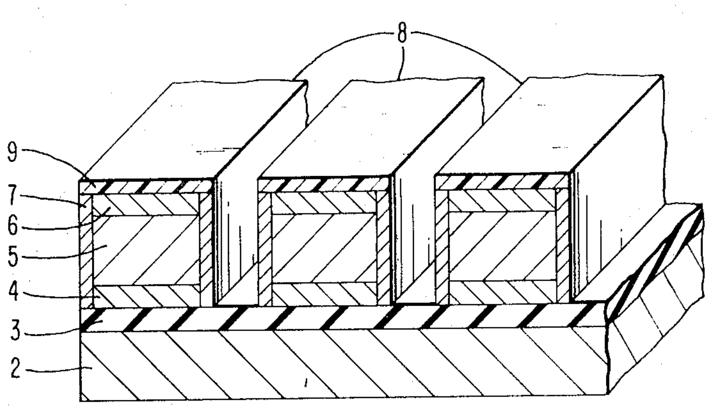
FIG. 3 is the multilayered device of FIG. 2 having been photoetched and edge-plated according to the flow chart in FIG. 1.

A second smoothing copper film is deposited according to the above described method. Finally, a second magnetic film 5 is deposited. The device 1 is subjected to a heat cycle to 200° C. in an easy axis magnetic field to induce magnetic stability. After heating the device 1 it is then photoetched by conventional methods to form a set of parallel bit lines 8 as shown in FIG. 3. A typical array is 3 ×3 inches in area and consists of 360 bit lines 4 mils wide and spaced 4 mils apart. The photoetch resist resin 9 is retained on top of the bit lines so that only the line edges will be exposed during electrodeposition of the edge closure magnetic film.

The photoetched device is then edge-plated according to methods of this invention. The device serving as a cathode is immersed in an electrolytic plating bath having the following composition and ranges:

| Low | Preferred | High |
|---|---|---|
| $NiCl_2 \cdot 6H_20$—20.0 g. | 30.0 g. | 50.0 g. |
| $FeSO_4 \cdot H_2O$—1.5 g. | 2.2 g. | 6.0 g. |
| $CuSO_4 \cdot H_2O$—0 g. | 0.15 g. | 0.50 g. |
| $K_2CO_3$a—0 g. | 0.35 g. | 0.50 g. |
| $KNaC_4H_4O_6 \cdot 4H_2O$—7.0 g. | 10.0 g. | 15.0 g. |
| Saccharin as a 10% solution—0.10 g. | 0.15 g. | 0.3 g. |
| Triton × 100 as a 1% solution—0.3 g. | 0.4 g. | 0.6 g. |
| Potassium.Sodium Tartrate $KNaC_4H_4O_6 \cdot 4H_2O$ | | |

Once the photoetched device has been established in the bath with an accompanying anode, a series of current pulses are passed between the anode and cathode. The required amount of current of the pulses vary according to the thickness of the bit lines 8. For example, where the lines 8 are 2, 6, and 12 microns thick, currents of 170 ma., 240 ma. and 330 ma. are used respectively. The current pulses are on for about 6 seconds' duration at a time and are halted for about 24 seconds. At the beginning of the period when the current is off, the bath is vigorously agitated for about 4 seconds. Each current pulse deposits a layer of magnetic material of about 300 A. It should be pointed out that unless the above plating conditions are vigorously adhered to, the magnetic properties of the resulting plated films deviate considerably from the desired results, i.e., coercivities of 6 or less are not reproducibly obtained. The magnetic films, having a thickness between 2,500 and 4,000 A., deposited at the edges of the bit lines 8 by the above method, are found to have uniform magnetic properties, coercivities of 6 or less, and high permeabilities on the order of 1,000.

It should be understood, that while the invention has been described as a method of edge-plating bit lines of coupled film devices for flux closure, the method herein described can similarly be used advantageously for plating magnetic films in cylindrical forms.

There has been described an improved method of edge-plating magnetic films in which a substrate is immersed in a bath containing soluble salts of nickel, iron, and copper and in which chloride ions are present. Included in the bath is a salt to maintain the pH in the range of from 3.8 to 5.9, a complexing agent, and a surface-leveling agent. The magnetic material is plated by pulsing the current for an interval of 6 seconds, waiting for about 20 to 24 seconds and stirring for 4 seconds at the beginning of the waiting period.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved method of edge-plating magnetic films on a coupled film device to provide flux closure therein comprising the steps of:
   a. providing an electroplating bath consisting of: about 20 g. to about 50 g. of $NiCl_2 \cdot 6H_2O$; of about 1.5 g. to about 6.0 g. of $FeSO_4$hu $.7H_2O$; of about 0.15 g. of $CuSO_4 \cdot 5H_2O$; of about zero grams to about 0.50 g. of $K_2CO_3$; of about 7.0 g. to about 15.0 g. of an alkali metal tartrate; of about 0.3 g. to about 0.6 g. of Triton X–100 as a 1 percent solution; and of about 0.10 to 0.30 g. of saccharin as a 10 percent solution, said bath having a pH of about 3.9 to about 5.8.
   b. providing an anode and cathode in said bath, said cathode being said coupled film device;
   c. applying between said anode and cathode a series of current pulses, of selected duration and having a selected amount of current sufficient to deposit a layer of magnetic material on said edge of said coupled film device.
2. A method according to claim 1 wherein said current pulses are of a duration of about 6 seconds and are off for a duration of about 24 seconds.
3. A method according to claim 1 including the step of agitating said bath for about 4 seconds between each of said current pulses.
4. A method according to claim 1 wherein the magnitude of each of said current pulses is from about 170 to about 330 milliamperes.
5. A method according to claim 1 wherein said bath consists of 30 grams of $NiCl_2 \cdot 6H_2O$; 2.2 grams of $FeSO_4 \cdot 7H_2O$; 0.15 grams of $CuSO_4 \cdot 5H_2O$; 0.35 grams of $K_2CO_3$; 10.0 grams of potassium tartrate; 0.4 grams of Triton X–100 as a 1 percent solution and 0.15 grams of saccharin as a 10 percent solution.
6. A method according to claim 1 including the step of agitating said bath for about 4 seconds between each of said current pulses;
   said current pulses are of a duration of about 6 seconds and are off for a duration of about 24 seconds;
   said bath consists of 30 grams of $NiCl_2 \cdot 6H_2O$; 2.2 grams of $FeSO_4 \cdot 7bH_2O$; 0.15 grams of $CuSO_4 \cdot 5H_2O$; 0.35 grams of $K_2CO_3$; 10.0 grams of potassium tartrate; 0.4 grams of Triton X–100 as a 1 percent solution and 0.15 grams of saccharin as a 10 percent solution;
   and the magnitude of each of said current pulses is from 170 to about 330 milliamperes.
7. A device prepared by the method of claim 1.

* * * * *